US008157313B2

(12) United States Patent  
Nutt et al.

(10) Patent No.: US 8,157,313 B2
(45) Date of Patent: Apr. 17, 2012

(54) STORAGE UNIT WITH ELECTRONIC DEVICE MOUNTING STRUCTURE

(75) Inventors: Kevin Nutt, Summerfield, NC (US); Sandro Ramos, High Point, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 12/644,057

(22) Filed: Dec. 22, 2009

(65) Prior Publication Data

US 2010/0096875 A1    Apr. 22, 2010

Related U.S. Application Data

(62) Division of application No. 11/887,856, filed as application No. PCT/US2005/012177 on Apr. 11, 2005, now Pat. No. 7,654,622.

(51) Int. Cl.
*B60R 7/04* (2006.01)

(52) U.S. Cl. ...................................... 296/37.7; 312/245

(58) Field of Classification Search .................. 248/500, 248/505, 503; 312/245–248, 27.1, 27.3; 296/37.1, 37.7
See application file for complete search history.

(56) References Cited

U.S. PATENT DOCUMENTS

| 4,031,721 | A | * | 6/1977 | Anderson | 70/58 |
| RE33,112 | E | * | 11/1989 | Durham | 296/37.7 |
| 5,135,197 | A | * | 8/1992 | Kelley et al. | 248/551 |
| 5,911,661 | A | * | 6/1999 | Murray et al. | 52/220.6 |
| 7,165,798 | B2 | * | 1/2007 | Chamberlain et al. | 296/37.1 |
| 7,654,622 | B2 | * | 2/2010 | Nutt et al. | 312/223.6 |

* cited by examiner

*Primary Examiner* — Dennis Pedder
(74) *Attorney, Agent, or Firm* — Michael Pruden; Martin Farrell

(57) ABSTRACT

An overhead storage unit including a single unit that spans across substantially the entire lateral width of the vehicle adjacent the top of the front windshield. In some preferred embodiments, the overhead storage unit includes a removable electronic device (such as, e.g., a CB radio support). In some preferred embodiments, the storage unit also includes a novel removable switch plate and a unique CB microphone mount.

15 Claims, 12 Drawing Sheets

STORAGE UNIT WITH ELECTRONIC DEVICE MOUNTING STRUCTURE

This is a divisional application of application Ser. No. 11/887,856, filed Oct. 4, 2007 which was the National Stage of International Application No. PCT/US05/012177, filed Apr. 11, 2005. The disclosures of application Ser. No. 11/887, 856 and International Application No. PCT/US05/012177 are hereby incorporated herein by reference.

INTRODUCTION

The present invention relates to vehicle parts and components, and the preferred embodiments relate to, e.g., systems and methods for providing vehicle storage and for mounting electronic devices within vehicles, such as, most particularly, trucks or commercial vehicles.

BACKGROUND

In modern times, vehicles, such as, e.g., trucks, buses, cars and the like, often include a variety of electronic devices for an assortment of purposes. By way of example, vehicles can often include one or more of the following electronic devices: citizens band (CB) radios; AM/FM radios; cassette players; CD players; DVD players; video players; cellular phones; global position system (GPS) devices; radar detectors; entertainment devices; computers; etc. Often, these electronic devices are ancillary electronic devices that are not required for the operation of the vehicle itself, but for other purposes (such as, e.g., for business use or operator convenience) during the time period in which the operator is within the vehicle.

However, along with this increase in the number of ancillary electronic devices comes the need for features and structures to accommodate these ancillary electronic devices. The requirements imposed upon vehicle dash boards, consoles and other interior elements have, thus, increased over recent years, becoming increasingly complex and costly. Among other things, consoles often need to accommodate a variety of ancillary electronic devices. Meanwhile, there is also an increasing need to provide vehicle operators with increased vehicle storage space. As the complexities of vehicle dash boards, consoles and the like increase so do the costs related to the manufacture of these components.

While the foregoing issues are germane to both family vehicles (such as, e.g., cars and the like) and commercial vehicles (such as, e.g., trucks, buses and the like), these issues are often more significant in the context of commercial vehicles because, among other things, commercial entities often have business needs to, among other things, a) limit costs, b) increase productivity, and c) reduce equipment down time.

With reference to FIG. 7, in some existing trucks of the present assignee, an overhead compartment 10 has been implemented for storage and for supporting a CB radio. In such implementations, the compartment 10 has a length in a lateral direction L that is substantially smaller than a width of the truck in which the compartment 10 is installed. In order to mount a CB radio (not shown), a mounting strap 15 (e.g., a strap that is manually attached using hook and loop fastening fabric such as, e.g., VELCRO fastening fabric) has been used to retain the CB radio. In order to mount the compartment 10 within a vehicle, the compartment 10 has been fixedly attached to a headliner (not shown) of the truck via a plurality of mounting brackets BK, which facilitate attachment to the headliner via bolts B.

While the system shown in FIG. 7 provides convenient overhead access for an operator, it is appreciated that there are a variety of limitations associated with such systems. Among other things, the present invention considers a) that it can be difficult to install a CB radio into such a system (which has limited manual manipulation room for the strap 15, the power connectors, etc.), b) that a substantial number of components (e.g., including mounting brackets, etc.) are required in such a system, and c) that a substantial number of components parts and associated costs are required to manufacture such a system. Thus, there has been a need to improve such systems to overcome one or more of the above and/or other limitations therein.

In addition to the foregoing background art, a variety of other systems and devices are also known. By way of example, additional background documents include:

a) U.S. Pat. No. 4,888,072, which shows an overhead "accessory support device for [a] vehicle windshield and [a] method of installing;"
b) U.S. Pat. No. 4,818,010, which shows an overhead "mounting system for equipment in police vehicles;"
c) U.S. Pat. No. 4,717,193, which shows an overhead "shelf for a vehicle cab;"
d) U.S. Pat. No. 4,421,190, which shows an "overhead instrument console;"
e) U.S. Pat. No. 4,226,460, which shows an overhead "long-distance truck cabin;" and
f) U.S. Pat. No. 4,079,987, which shows an overhead "container system for entertainment and communications equipment."

As set forth below, the preferred embodiments of the present invention provide notable advancements over those described in the documents outlined as well as other existing systems and devices.

SUMMARY

The preferred embodiments of the invention greatly improve upon existing systems and methods.

In some of the illustrative embodiments disclosed herein, an overhead storage unit is provided within a vehicle, such as, e.g., a truck. The storage unit can be used, e.g., to provide storage and/or for supporting an ancillary electronic device, such as, e.g., a CB radio in the vicinity of the operator. As described below, the preferred embodiments include a variety of features having a variety of advantages and/or benefits over existing systems. In some illustrative embodiments, some or all of the following advantages can be achieved over existing systems: 1) consolidation of parts; 2) reduction of costs; 3) improved electronic device mounting structure; 4) ease of use (e.g., freedom for fingers and phalange flexibility); 5) ease of upgrading and/or option changes; and 6) improved electronic-device-storage embodiments.

According to some embodiments, an ancillary electronic device storage assembly for a vehicle is provided that includes: a base configured to support an electronic device; a retaining mechanism configured to span over the electronic device when supported on the base; a moving mechanism configured to move the retaining mechanism against and retain the electronic device; the moving mechanism having a manually driven element that is accessed from an exterior of the storage assembly; whereby the retaining mechanism can move against and retain the electronic device by forces imparted manually by a user while the user's hands are located externally to the storage assembly. In some embodiments, the storage assembly is an overhead storage unit. Preferably, the manually driven element is accessed from below the overhead storage unit. In some preferred embodiments, the electronic device is a CB radio. In some embodiments, the moving mechanism is a screw drive mechanism, and the manually driven element is a head of a screw that can be manually driven with a screw driver.

According to some other embodiments of the invention, an ancillary electronic device assembly for a vehicle is provided that includes: a base configured to support the electronic device; a channel along an upper surface of the base configured to receive wiring of the electronic device; a well proximate a front side of the base into which the channel extends; and at least one electrical connector within the well for electrically connecting the wiring of the electronic device. In some embodiments, the electronic connector is a power connector. Preferably, the base is mounted upon a storage unit having at least one additional storage area, or, more preferably, is mounted upon a storage unit having a plurality of additional storage areas.

According to some other embodiments, an assembly for providing a multi-option overhead storage unit for a vehicle which includes: a single integrally molded storage unit: the storage unit being configured to be mounted proximate a juncture between a ceiling of a vehicle and a front windshield of the vehicle, and the storage unit being sized so as to span across substantially the entire lateral width of the windshield; the storage unit including a plurality of storage compartments located laterally along the storage unit; and at least one of the storage compartments being configured to receive an ancillary electronic device supported on an electronic device support; and an ancillary electronic device support that is mountable within the at least one of the storage compartments; whereby the ancillary electronic device support can be omitted from the storage unit to provide a first option without a supported electronic device, and can be mounted within the at least one of the storage compartments to provide a second option with a supported electronic device. In some embodiments, the storage unit includes a plurality of mounting members, wherein the mounting members are adapted to accommodate headliner mounting locations in a plurality of vehicles having different headliner mounting locations. In some embodiments, the storage unit is configured to be mounted within the plurality of vehicles without additional brackets between the storage unit and the headliners.

According to some other embodiments, an overhead storage unit for a vehicle is provided that includes: a plurality of compartments, the compartments having openings through which a user can access the compartments; a removable electronics components support plate configured to be located over at least one of the openings, the electronics components support plate including at least one of a microphone mount, a plurality of switches, and a power source.

According to some other embodiments, a vehicle having a manufacturer supplied CB radio microphone support is provided that includes: removable manufacturer supplied support plate mounted upon a storage unit of the vehicle; a manufacturer supplied microphone support integrally formed in the support plate; and a CB radio microphone supported on the microphone support.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which like reference numerals indicate like or similar parts, and in which.

DETAILED DESCRIPTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

1. General

Figure 1:
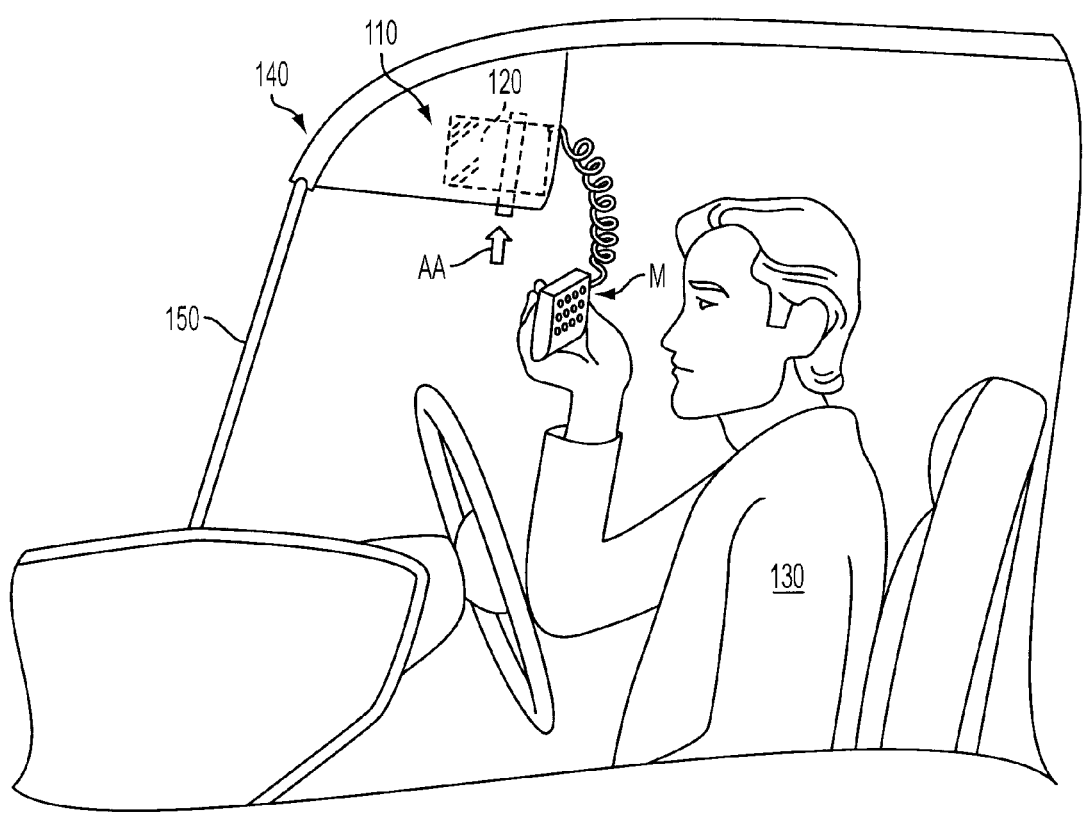
FIG. 1 is a side view of an illustrative storage unit within a vehicle in an illustrative overhead position to a vehicle operator.

With reference to FIG. 1, an illustrative embodiment of an overhead storage unit 110 is shown within a vehicle, such as, e.g., a truck 140. The storage unit 110 can be used, e.g., to provide storage and/or for supporting an ancillary electronic device, such as, e.g., a CB radio 120 in the vicinity of the operator 130. Preferably, the electronic device is located in an ergonomically desirable position, such as in the illustrative example shown in FIG. 1. As described below, the preferred embodiments include a variety of features having a variety of advantages and/or benefits over existing systems. In some illustrative embodiments, some or all of the following advantages can be achieved over existing systems.

a. Consolidation of Parts

In the preferred embodiments, a storage unit 110 is provided that greatly limits the amount of materials and component parts. By way of example, in the preferred embodiments, the storage unit 110 can include, e.g., a) a single unitary unit configured to span across of width of the vehicle, b) a unit that is mounted without the use of additional brackets required in existing systems (such as, e.g., employing reinforcing ribs to structurally enhance the storage unit itself, employing mounting hole positions arranged to match headliners of plural vehicles and/or the like), d) an elimination of rigid door structures by implementing, e.g., nets, fabrics and/or the like.

b. Reduction of Costs

In the preferred embodiments, a storage unit 110 is provided that can reduce costs considerably over existing systems.

c. Improved Electronic Device Mounting Structure

In the preferred embodiments, a storage unit 110 is provided that includes an electronic device mounting structure having substantial advantages and benefits over existing systems.

d. Ease of Use (e.g., Freedom For Fingers and Phalangeal Motion)

In the preferred embodiments, a storage unit 110 is provided upon which, e.g., an electronic device can be easily manually installed by an individual, without space restrictions that may otherwise impede freedom of movement as in existing devices.

e. Ease of Upgrading and/or Option Changes

In the preferred embodiments, a storage unit 110 is provided that can be readily adapted to different installations options. For example, in some embodiments, a storage unit 110 is provided that can be readily marketed in a first option as a storage unit without an ancillary-electronic-device (e.g., storage-only) or, alternately, in a second option as an ancillary-electronic-device(s) (e.g., CB radio and/or other devices) supporting storage unit.

2. Electronic-Device-Storage Embodiments

Figure 2A:
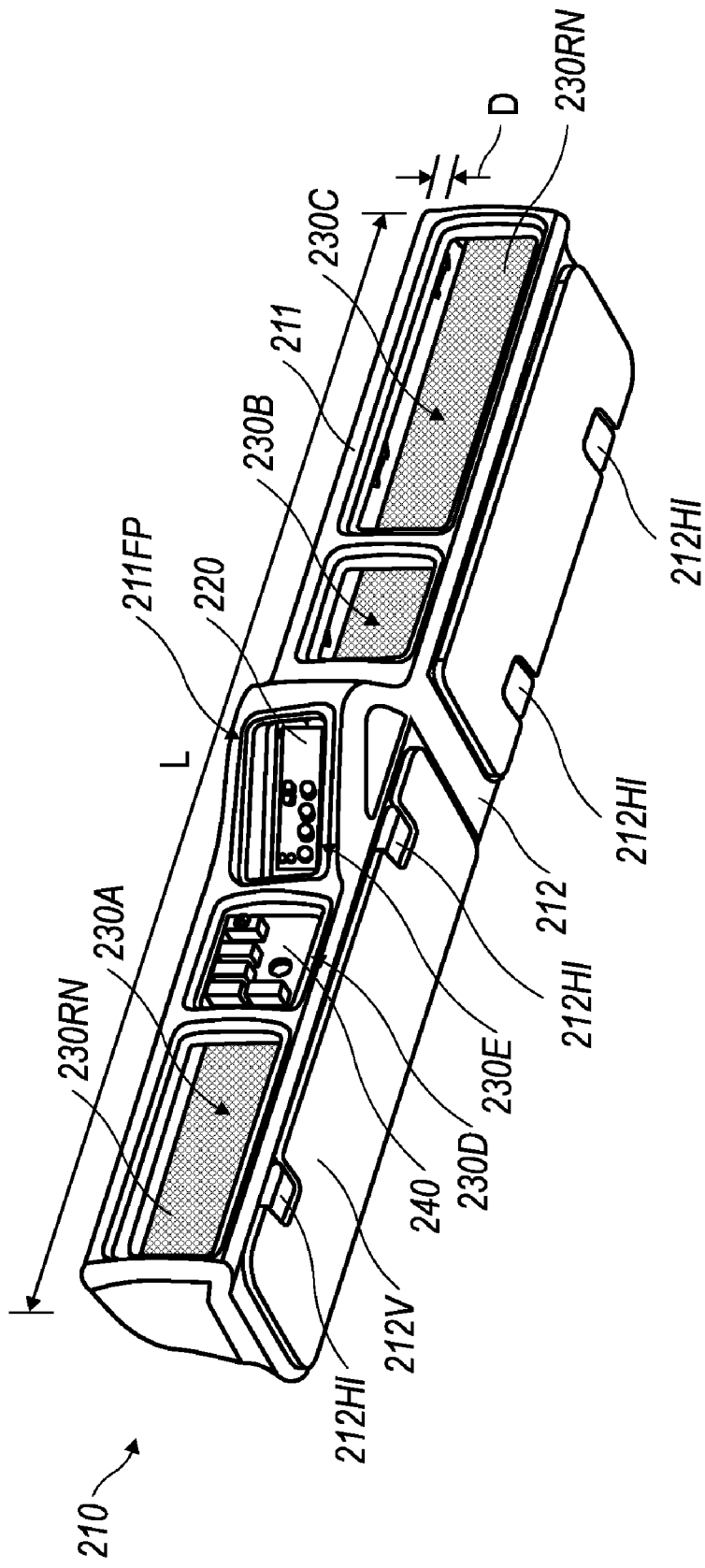
FIG. 2(A) is a bottom front perspective view of an embodiment of a storage unit along with an ancillary electronic device (such as, e.g., a CB radio) and with an electronics component support plate (such as, e.g., for supporting switches or the like)
Figure 2B:
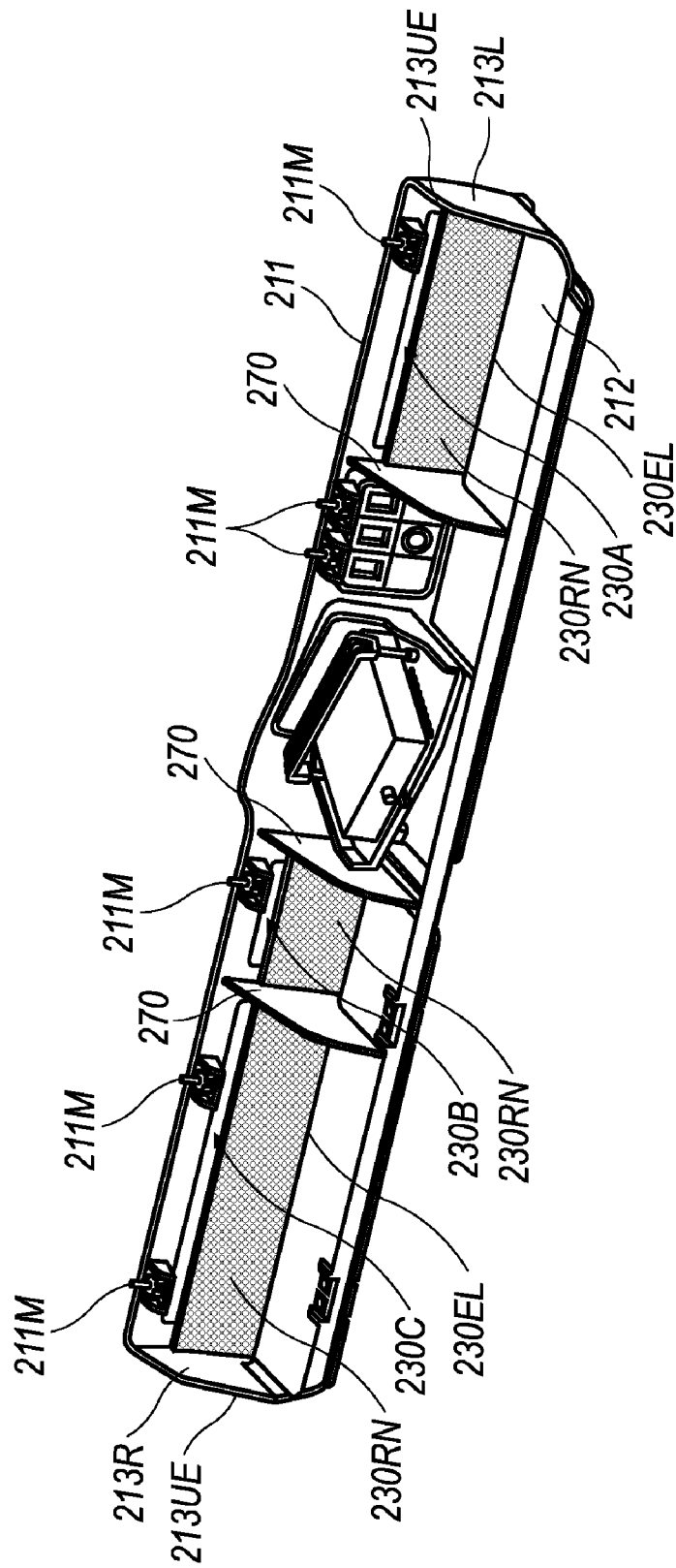
FIG. 2(B) is a top rear perspective view of the embodiment shown in FIG. 2(A)

FIGS. 2(A) and 2(B) show an illustrative embodiment of a storage unit 210 which includes at least one storage area(s) and at least one mounting structure for an ancillary-electronic-device 220.

As shown, the storage unit 210 preferably has a length in a lateral direction L such that it extends across substantially the entire width of a vehicle (such as, e.g., a truck 140 as shown in FIG. 1) between left and right sides of the vehicle. In this regard, the length of the storage unit 210 in the lateral direction L is preferably approximately the same as that of the front windshield 150 shown in FIG. 1. In addition, as depicted in FIG. 1, the storage unit 210 is preferably configured so as to be located predominantly above the operator's field of view through the front windshield 150.

In some preferred embodiments, the storage unit 210 is formed from an integral unitary piece of material (such as, e.g., from an injection molded elastomeric or plastic material and/or any other suitable material). In some preferred constructions, the storage unit 210 includes at least a front wall 211 and a bottom wall 212. In some preferred embodiments, the upper end of the front wall 211 includes mounting members 211M located to facilitate mounting directly to the roof of the vehicle (such as, e.g., shown in FIG. 1) without intermediate brackets structures or the like. In addition, the storage unit 210 can also include left and right lateral side walls 213L and 213R, respectively. As depicted, the upper edges 213UE of the left and right lateral side walls 213L and 213R are preferably contoured to follow the contour of the vehicle ceiling in some embodiments.

In some embodiments, as illustrated, the bottom wall 212 can include other elements mounted thereon, such as, e.g., sun visors 212V and/or other elements (such as, e.g., lights, electronic-devices, radar detectors, etc.). In embodiments having visors 212V mounted thereto, such visors 212V can be mounted, e.g., to pivot from an underside of the bottom wall 212, such as, e.g., about hinges 212HI. The hinges 212HI can, in some instances, be mounted so as to pivot from a rearward side of the bottom wall 212 (such as, e.g., shown at the left or driver's side of the storage unit 210) and/or from a forward side of the bottom wall 212 (such as, e.g., shown at the right or passenger's side of the storage unit 210).

In some preferred embodiments, as shown, the front wall 211 includes a plurality of storage openings 230 through which personal items and/or the like for the vehicle operator or user can be placed for storage. In the illustrative embodiment shown in FIGS. 2(A) and 2(B), the storage openings include three storage openings 230A, 230B and 230C. However, in other embodiments, the storage unit 210 can include any number of openings, such as, e.g., from one opening to any number of desired openings.

In some preferred embodiments, as shown in FIG. 2(A), the storage unit 210 also includes a plurality of other storage openings 230D and 230E that are used for pre-mounting vehicular items. In particular, in the preferred embodiments, the opening 230E is configured to receive an ancillary-electronic-device, such as, e.g., a CB radio 220, and the opening 230D is configured to receive an electronics-components-support structure, such as, e.g., an electronics-components-support-plate 240.

As shown in FIG. 2(B), and as discussed further below, with reference to FIGS. 3(A)-3(E), the CB radio 220, or the like, is preferably mounted upon the support unit 210 via an electronic-device-support 250 (including, e.g., a support platform) and a retaining mechanism 260 (including, e.g., a clamping member, such as, e.g., a rigid element, such as, e.g., a beam, and/or a flexible element, such as, e.g., a strap). In the preferred embodiments, however, the retaining mechanism is configured to retain the CB radio 220 or the like by the application of a manual force external to the support unit 220 such as to, e.g., effect movement of the retaining mechanism 260 by easy access external to the storage unit 210. See, e.g., arrow AA shown in FIG. 1 representing an illustrative point of external access in some illustrative embodiments.

Preferably, the storage openings 230A, 230B and/or 230C, which have no pre-mounted vehicular items therein, can be used by a vehicle operator or the like to freely store items therein as desired. In some preferred embodiments, rather than utilizing, e.g., rigid doors to cover the front of these openings 230A, 230B and/or 230C, these openings are at least partly covered with a retaining-netting 230RN that is stretched across these openings. In some embodiments, the netting can be replaced with a retaining fabric (see, e.g., retaining fabric 230RF shown in FIGS. 5(A) and 5(B)) or another flexible material. Or, alternatively, one or more of the openings can either remain uncovered or can be provided with a rigidly attached door or the like. As illustrated in FIG. 2(A), the retaining netting preferably extends upwardly a vertical height that is sufficient to retain items within compartments behind the openings, while providing a sufficient depth d to allow a user to freely pass their hands through the opening to grasp items stored thereon and/or to place items thereon. In the preferred embodiments, the upper edge of the retaining-netting 230RN is supported upon an elastic wire or string 230EL. The retaining netting 230RN can be mounted to the storage unit 210 using a variety of mounting mechanisms, such as, e.g., rivets, screws, clamps and/or tying the netting to mounts on the storage unit.

As shown in FIG. 2(B), in some preferred embodiments, the storage unit 210 includes a plurality of divider elements 270 distributed at one or more position, preferably at a plurality of positions, along the lateral length L of the unit. In the illustrative example, three divider elements 270 are implemented. In some examples, the divider elements could be integrally formed with the storage unit 220 (such as, e.g., by forming the unit 210 and the divider elements 270 together in the same injection molding process). In other examples, the divider elements could be removably attachable to the unit 210, such as, e.g., by inserting the elements into respective receiving slots and/or otherwise mounting the divider elements to the unit 210. Among other things, the employment of insertable divider elements 270 can enable the elements to be added and/or removed as desired; for example, to accommodate larger items, in some examples a removable divider element 270 could be either omitted in the original installation by the manufacturer or removed by a consumer or user after purchase of the vehicle.

3. Limited Use (e.g., Storage Only) Embodiments

Figure 2C:
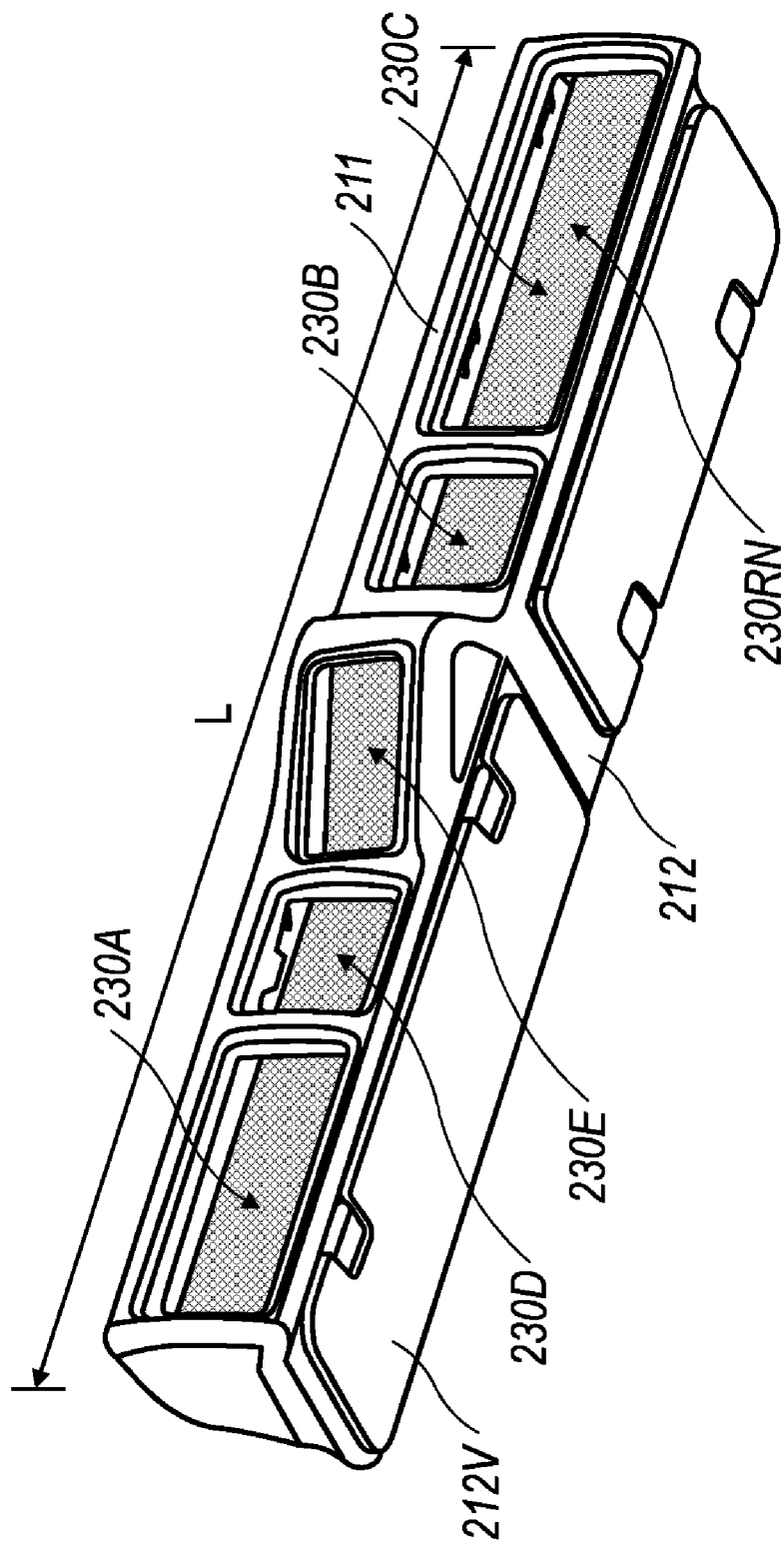
FIG. 2(C) is a bottom front perspective view of an embodiment similar to that shown in FIG. 2(A) without an added ancillary electronic device (such as, e.g., a CB radio) and without an added electronics component support plate (such as, e.g., for supporting switches or the like)

FIG. 2(C) shows another embodiment of the invention in which a storage unit 210 similar to that shown in FIGS. 2(A) and 2(B) is implemented without an electronics-components-support-plate 240 and without an ancillary electronic device, such as, e.g., a CB radio 220. Accordingly, in this illustrative embodiment, the storage unit 210 can be used to provide a plurality of convenient storage compartments. It should be appreciated based on this disclosure that this embodiment can be substantially similar to and can be modified in a like manner to the embodiment shown in FIGS. 2(A) and 2(B). By way of example, all of the various other features described above but not shown in FIG. 2(C) can be employed herein, such as, e.g., divider elements 270, mounting elements 211M, etc. In addition, as in the foregoing embodiment shown in FIGS. 2(A) and 2(B), the number of openings 230 can be modified between different embodiments.

In some preferred embodiments, at least some of the same component parts can be used to provide a first storage unit option that is similar to that shown in FIG. 2(C) and to provide a second storage unit option that is similar to that shown in FIGS. 2(A) and 2(B). In this manner, by way of example, a manufacturer can utilize the same or similar parts to manufacture both options, with the exception that, e.g., in the second storage unit option, one or more of the electronics-components-support-plate 240 and/or the ancillary-electronics-device 220 can be provided.

4. Illustrative Electronic Device Mounting Structures

Figure 3A:
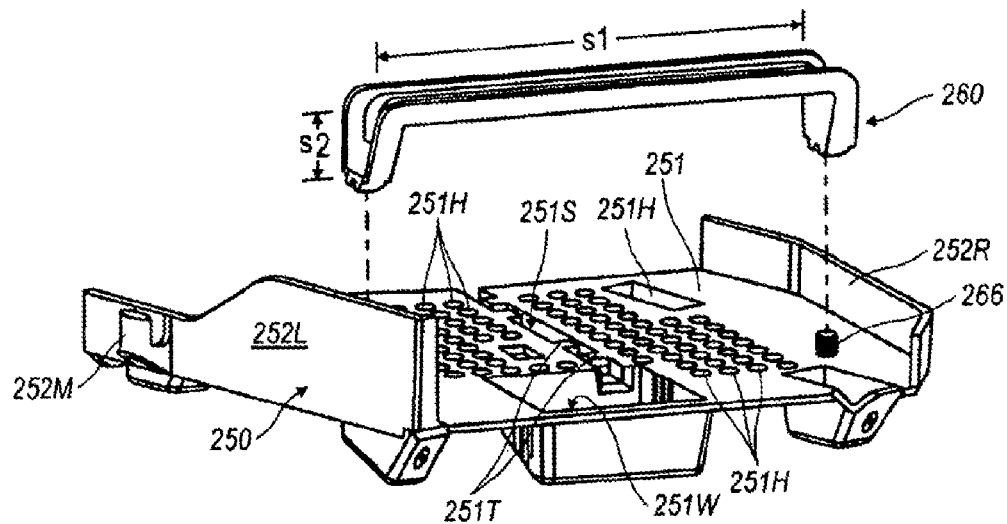
FIG. 3(A) is a front top perspective view of certain components of an illustrative support device having a retaining mechanism depicted in a displaced position for explanatory purposes.
Figure 3B:
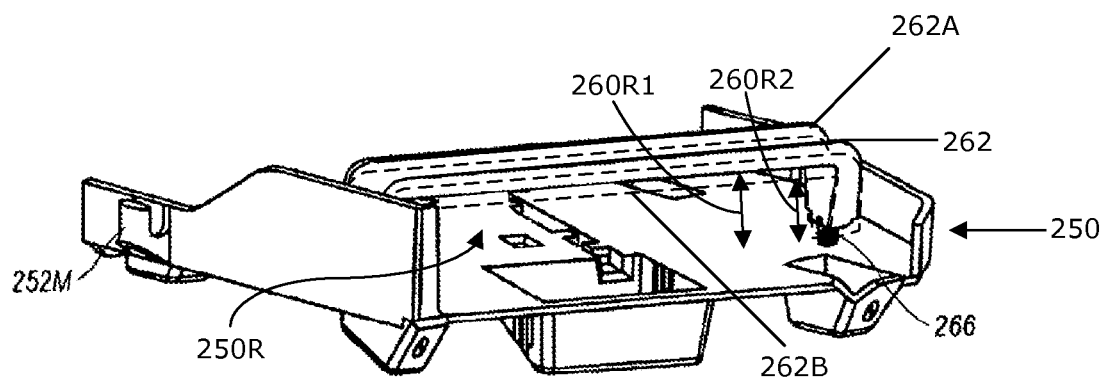
FIG. 3(B) is a front top perspective view of certain components of an illustrative support device like that shown in FIG. 3(A), and with a retaining mechanism depicted in an adjacent position for explanatory purposes.

As indicated above, FIGS. 3(A) to 3(E) also show some preferred embodiments of a retaining mechanism 260. As shown in FIG. 3B, the retaining mechanism 260 includes a retaining member 262. According to one aspect of the present embodiment, the retaining member and the support 250 cooperate to define an electronic device receiving space 250R located between the retaining member 262 and the support 250. As shown, the retaining member 262 includes a first position 262A whereat the electronic device receiving space 250R is provided with a first dimension 250R1. Also, shown therein, the retaining member 262 includes a second position 262B whereat the electronic device receiving space 250R is provided with a second dimension 350R2. As shown, the first dimension 250R1 is greater than the second dimension 250R2.

Figure 3C:
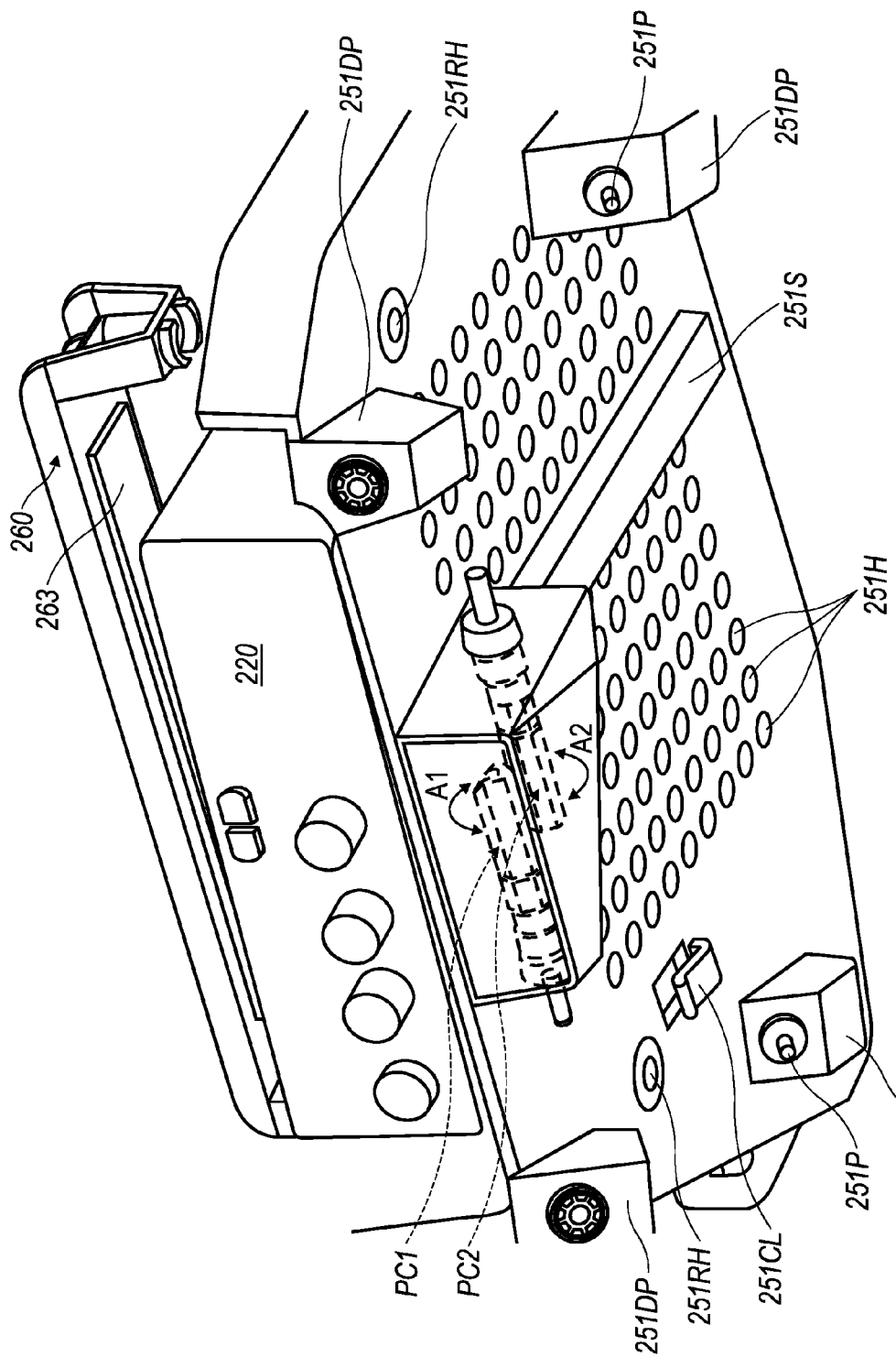
FIG. 3(C) is a bottom front perspective view of certain components of an illustrative support device similar to that shown in FIG. 3(A) according to some preferred embodiments.
Figure 3D:
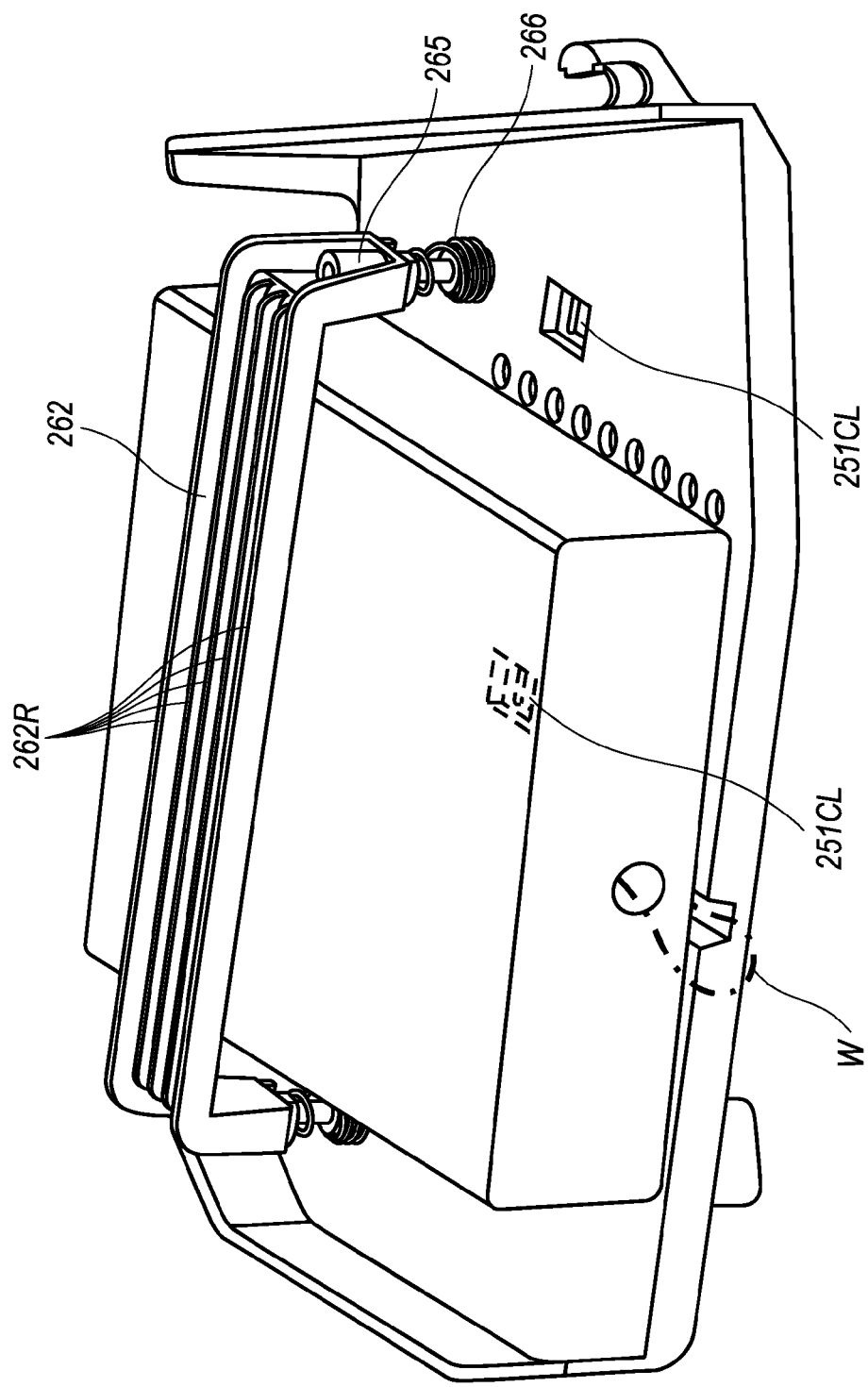
FIG. 3(D) is a top rear perspective view of certain components of an illustrative support device similar to that shown in FIG. 3(A) according to some preferred embodiments.
Figure 3E:
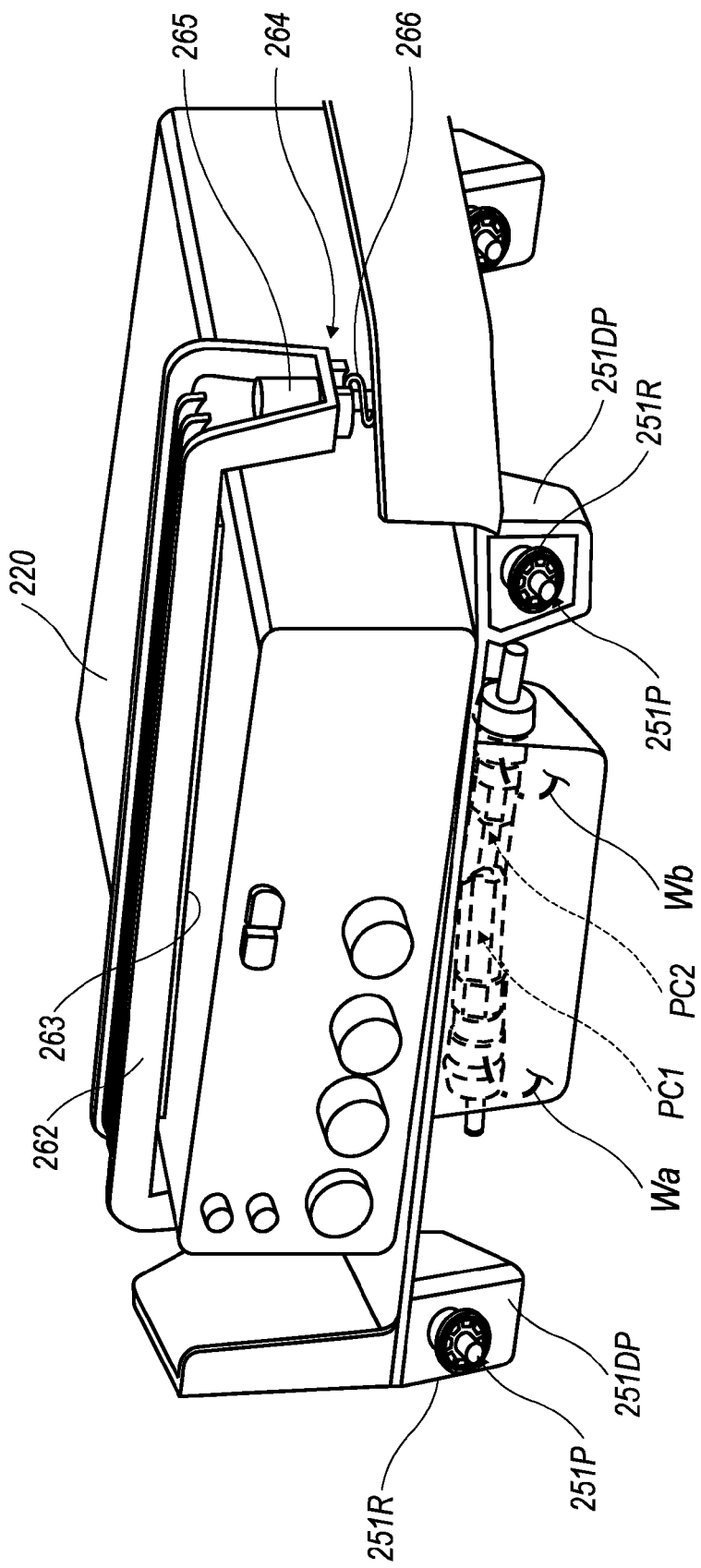
FIG. 3(E) is a top front perspective view of a CB radio mounted upon an illustrative support device similar to that shown in FIG. 3(A) according to some preferred embodiments.

Referring now to FIG. 3(E), as shown in this illustrative embodiment, the retaining mechanism 260 includes the inverted generally U-shaped member 262. In some preferred embodiments, the generally U-shaped member is a generally rigid member made with an elastomeric or plastic material. In some illustrative embodiments, as with the support 250 and the storage unit 210, the generally U-shaped member 262 can be made as an injection molded element. In some preferred embodiments, the retaining mechanism is normally biased upwardly, such as, e.g., by using a spring 266. In this manner, a user can freely locate a CB radio or the like beneath the generally U-shaped member 262 and into the electronic device receiving portion 250R while the springs 266 bias the member upwardly. Preferably, the retaining mechanism 260 is movably mounted via a movement mechanism 264 so that it can be moved (e.g., drawn) downward, such as, for example, from the first position 262A, shown in FIG. 3B, to the second position 262B, shown in FIG. 3B, so as to impinge against the surface of the CB radio or the like so as to retain the device. In this regard, any appropriate movement mechanism 264 can be employed in various embodiments, such as, e.g., a threaded screw shaft assembly, a cam mechanism, a pulley structure, a flexible strap or lanyard, a motor and/or the like.

In the preferred embodiments, the base wall 251 includes a number of advantageous features, such as, e.g., one or more, preferably all of the following features in the preferred embodiments.

Figure 4:
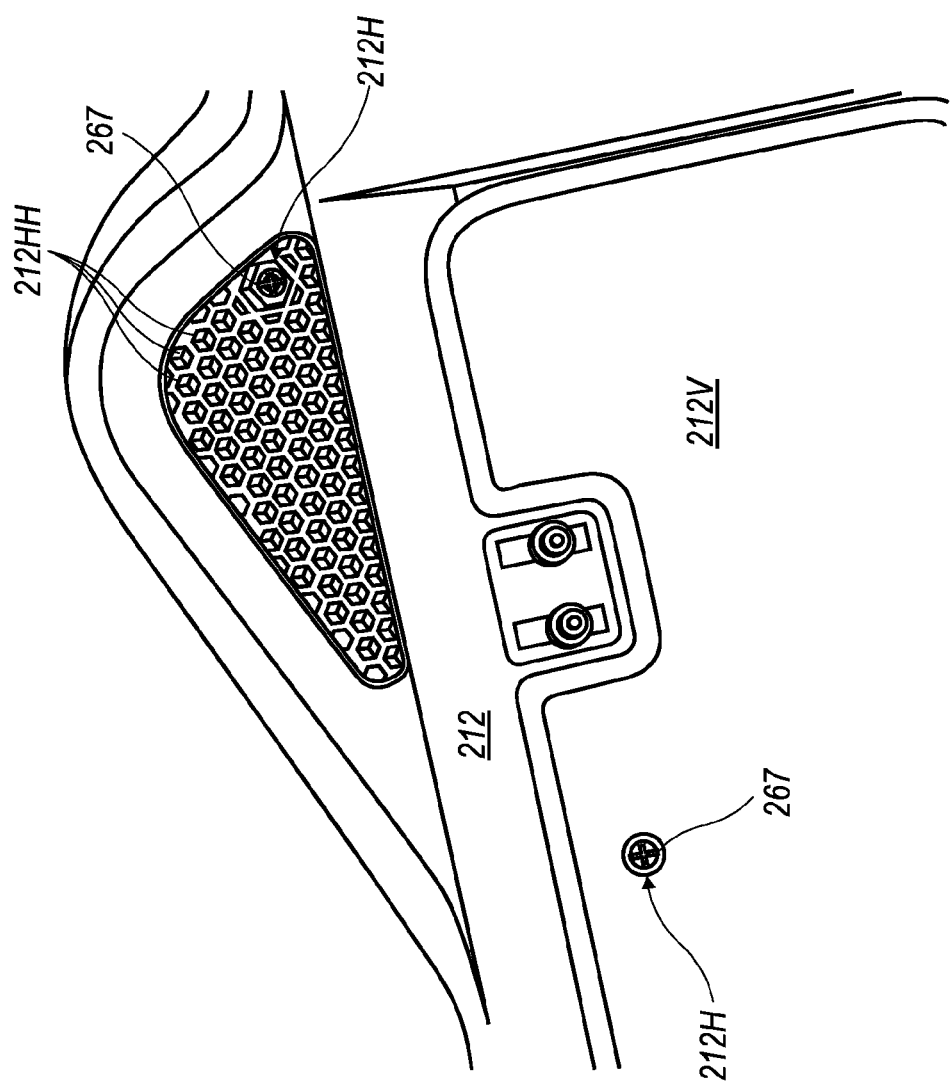
FIG. 4 is a partial bottom view depicting a storage unit in the vicinity of a CB radio similar to that shown in FIG. 3(A) according to some preferred embodiments.

First, the base wall 251 preferably includes a large array of through-holes 251H. Preferably, these through-holes 251H are sufficient to allow an electronic device that allow for the passage of acoustic sounds to and/or from the electronic device (such as, e.g., via a speaker, which in, e.g., a CB radio is often mounted on a bottom surface of the CB radio) so as to freely transmit and/or receive sound therethrough. With reference to FIG. 4, when mounted within the storage unit 210, the through-holes 251H preferably align with an array of through-holes 212HH formed in the bottom wall 212 of the storage unit 210. In the preferred embodiments, as shown, the through-holes 212HH are located within a forward protrusion section 211FP of the front wall 211.

Second, with reference to FIGS. 3(A) and 3(B), during placement of the support 250 upon the storage unit 210, downward projections 251DP preferably are received within respective receptacles (not shown) such as to readily align the support 250 with respect to the storage unit 210 structure. In some illustrative and non-limiting embodiments, the downward projections 251DP and the receptacles can include connection mechanisms (such as, e.g., snap-fit members, press-fit members, clamps, bolts and/or the like) to facilitate retention of the support 250 upon the storage unit 210 once assembled thereon. By way of example, one or more of the projections 251DP can include a projecting pin 251P that can be press-fit into a resilient press-fit retaining washer 251R that is fixed in relation to the support unit receptacles (not shown). In some preferred embodiments, the members 251P can be screws that are screwed into the support unit.

Third, the support 250 preferably also includes a variety of elements to facilitate usage and management of electronic device wiring, cables and/or the like. In this regard, the support 250 preferably includes at least one, preferably all, of the following features.

a. A channel 251S for receiving wiring, cables and/or the like of the electronic device 220 mounted thereon, such as, e.g., in preferred embodiments a CB radio wiring harness. In this regard, often CB radios and other electronic devices include wires that extend from a rear of the device 220, such as, e.g., shown in dashed lines at reference number W in FIG. 3(D). In preferred embodiments, the channel 251S is adapted to extend from proximate a rear of the support 250 toward a front side of the support 250 where a user can more easily and/or more ergonomically access the wiring. As shown in FIGS. 3(A) and 3(B), the channel 251S can also include one or more, preferably a plurality, of overhanging tang members 251T which can help to retain wiring within the channel 251S after it is manipulated therein. It is contemplated, however, that in some embodiments, in which wiring may extend from a side of the device, a channel 251S could extend along a different path as long as it is directed to a well region 251W as discussed below.

b. A well region 251W formed proximate a front of the support 250. In use, an installer, a customer or the like can manipulate flexible wiring of a CB radio or the like so as to be situated within the channel 251S and to rest upon the base 251 as shown in FIG. 3(D). As shown in FIG. 3(E), a forward end of the wiring can be connected at, e.g., Wa and Wb, respectively, to the power connectors PC1 and PC2 which are conveniently located within the well 251W proximate a front side of the support 250. While any known type of electrical connector can be employed, in some illustrative embodiments, the connectors PC1 and PC2 include rotatable connector members (such as, e.g., employing two threadingly engaged clamping members) that can be conveniently rotated clockwise or counter clockwise around axes generally parallel to a front face of the CB radio or the like. In this manner, the power connectors PC1 and PC2 can be easily and ergonomically grasped and manipulated (e.g., rotated with one's fingers) within the well 251W. Here, the size and depth of the well is preferably configured to provide appreciable user freedom of movement (e.g., freedom for fingers and phalanges)

c. One or a plurality of integrally formed, e.g., molded-in, mounts (such as, e.g., two in the illustrated embodiments), such as, e.g., clips 251CL, for CB-radio connectors. In the preferred embodiments, these integrally formed mounts, e.g., clips 251CL, will enable the electrical harness to be readily secured at a proper location without the need for additional hardware. In this regard, as described above, it is also noted that the support 250 can also include one or more integrally formed mount 252M, such as, e.g., an upwardly extending hook-shaped member (e.g., clip) for receiving wiring of the electronic device and/or the like, such as, e.g., shown in FIGS. 3(A) and 3(B).

As indicated above, FIGS. 3(A) to 3(E) also show some preferred embodiments of a retaining mechanism 260. In this regard, reference is made to FIG. 3(E). As shown in FIG. 3(E), in this illustrative embodiment, the retaining mechanism 260 includes an inverted generally U-shaped member 262. In some preferred embodiments, the generally U-shaped member is a generally rigid member made with an elastomeric or plastic material. In some illustrative embodiments, as with the support 250 and the storage unit 210, the generally U-shaped member 262 can be made as an injection molded element. In some preferred embodiments, the retaining mechanism is normally biased upwardly, such as, e.g., by using a spring 266. In this manner, a user can freely locate a CB radio or the like beneath the generally U-shaped member 262 while the springs 266 bias the member upwardly. Preferably, the retaining mechanism 260 is movably mounted via a movement mechanism 264 so that it can be moved (e.g., drawn) downward so as to impinge against the surface of the CB radio or the like so as to retain the device. In this regard, any appropriate movement mechanism 264 can be employed in various embodiments, such as, e.g., a threaded screw shaft assembly, a cam mechanism, a pulley structure, a flexible strap or lanyard; a motor and/or the like.

In an illustrative preferred embodiment, screws 267, the heads of which are seen in FIG. 4, extend through through-holes 251RH, shown in, e.g., FIG. 3(C), within the base 251 of the support 250 in such a manner that heads of the screws will not pass there-through. Then, the threaded ends of the screws 267 are threaded into a threaded element 265 fixed to, and integrally formed with, the generally U-shaped member 262. Moreover, as illustrated in FIG. 4, the bottom wall 212 of the storage unit 210 preferably includes through-holes 212H via which the screws 267 can be readily accessed for tightening and/or loosening from a user access position external to the storage unit 210 (e.g., from beneath the storage unit 210 in this illustrative example). Preferably, this external user access can be made with a minimal amount of access room for manipulation inside the storage unit 210 in order to achieve mounting of the CB radio or the like. By way of example, the diameter of the through-holes 212H can be significantly less than a minimum size required for manual access, such as, e.g., being less than an inch in diameter, or even less than one half of an inch in diameter, or even substantially less in some embodiments.

As a result, in order to mount a CB radio or another electronic device on the support 250, the generally U-shaped member 262 can be clamped against the device, such as, e.g., shown in FIG. 3(D). Preferably, as shown in FIGS. 3(C) and 3(E), a bottom side of the member 262 is generally flat so as to apply a generally consistent force against the electronic device. In addition, preferably, the bottom side of the member 262 includes a thin foam pad attached thereto (such as, e.g., having a thickness of a few millimeters) so as to enhance gripping of the CB radio or the like, to distribute forces and/or the like. As shown in FIG. 3(D), in some preferred embodiments, the member 262 can be formed with one or more, preferably a plurality of reinforcing ribs 262 to enhance the strength and rigidity of the member.

Referring once again to FIG. 3(A), in some illustrative and non-limiting embodiments, the member 262 is configured such that a maximum width or span s1 is between about 180 and 270 millimeters, or, more preferably, between about 200 and 250 millimeters, or, more preferably, between about 220 and 230 millimeters, or, more preferably, about 226 millimeters. In addition, in some illustrative and non-limiting embodiments, the member 260 is movably supported, such as, e.g., via a movement mechanism 264, so as to have a maximum height (such as, e.g., in a fully outwardly biased state) from a bottom of the member 262 to the surface of the base 251 of between about 60 to 80 millimeters, or, more preferably, about 70 millimeters, and so as to have a minimum height from a bottom of the member 262 to the surface of the base 251 of between about 40 to 50 millimeters, or, more preferably, about 46 millimeters. In some illustrative and non-limiting embodiments, the devices shown in FIGS. 2(A) to 5(B) are depicted as to scale and proportional in size, such that some illustrative sizes and proportions can be understood based upon a comparison of the figures and the illustrative dimensions identified above in this paragraph.

5. Illustrative Electronics-Components-Support-Plate Structures

As discussed above, and as best shown in FIGS. 2(A) and 5(A), in some preferred embodiments a storage unit 210 is adapted so as to include an electronics-components-support structure, such as, e.g., an electronics-components-support-plate 240.

Figure 5A:
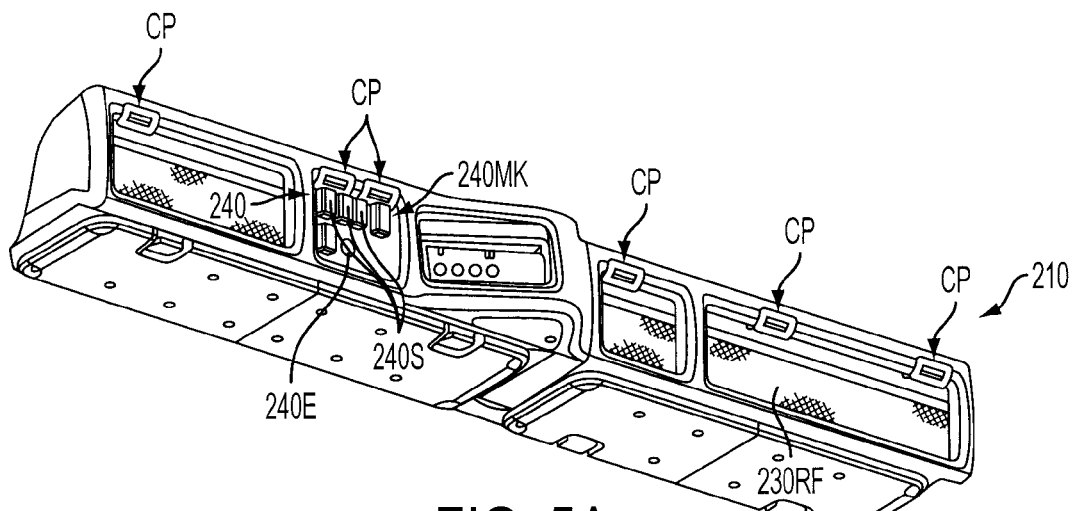
FIG. 5(A) is a bottom perspective view of an embodiment of a storage unit similar to that shown in FIG. 2, which includes an ancillary electronic device and an electronics component support plate.

In some preferred embodiments, the electronics-components-support-plate 240 preferably includes a plurality of switches 240S. Although FIGS. 2(A) and 5(A) depict illustrative embodiments having 4 switches, it is contemplated that in various embodiments one or more switches can be provided. In a various embodiments, the switches can enable an increased level of versatility, and can be employed by a manufacturer, an owner of the vehicle and/or an operator of the vehicle to provide desired functionality based on existing electrical needs, etc.

In some preferred embodiments, the electronics-components-support-plate 240 preferably includes an electrical outlet (not shown, but which can be, e.g., located at opening 240E) for electrical power supply. In some embodiments, the electrical outlet can be adapted to function as a 24 Volt electrical outlet, as a 12 Volt electrical outlet and/or as another desired electrical outlet. In a various embodiments, the provision of an electrical outlet can similarly provide an increased level of versatility.

In some preferred embodiments, electronics-components-support-plate 240 includes an fixedly attached or integrally formed mounted mounting structure 240MK, which is adapted for receiving a hanging element HM of a microphone (such as, e.g., the microphone M shown in FIG. 1). With the provision of such a hanging element, a CB radio or the like can readily be mounted within the vehicle in a simplistic manner without the need for the addition of unsightly or crude microphone supports by a consumer. Among other things, by providing the hanging element HM as formed as part of a component of the vehicle, a higher level of aesthetic quality and craftsmanship can be achieved, additional convenience can be achieved, and increased utility can be achieved. Moreover, by providing the hanging element HM in a manner that it can be readily added to and/or removed from the storage unit, a higher level of versatility and a wider range of user options can be achieved.

Figure 5B:
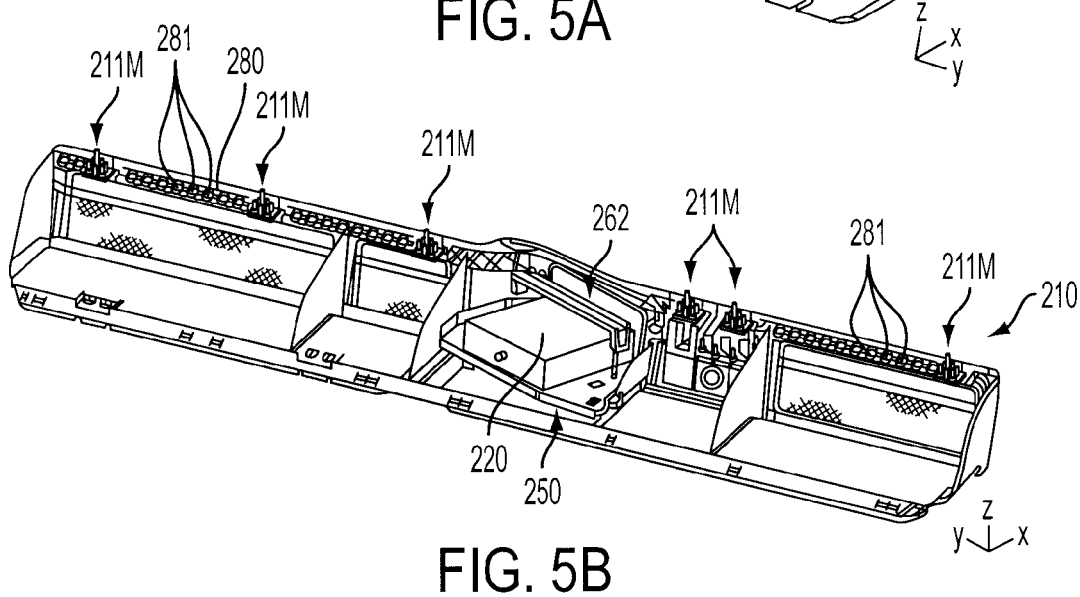
FIG. 5(B) is a top rear perspective view of the embodiment shown in FIG. 5(A)
Figure 5C:
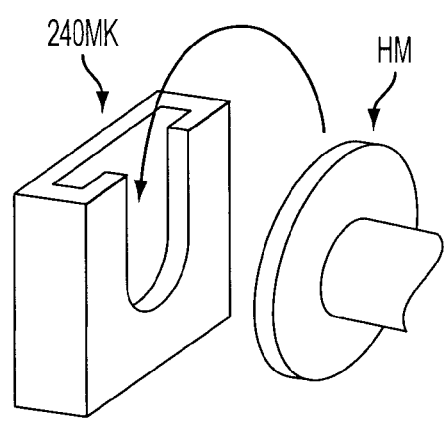
FIG. 5(C) is a perspective view of an illustrative mounting structure that receives a hanging element of a microphone.

The manner in which the electronics-components-support-plate 240 is mounted upon the storage unit 210 can vary depending on circumstances. By way of example, in some embodiments, a lower end of the plate 240 can be received in a slot (not shown) and the upper end can be pivoted into position. Then, the mounting members 211M (e.g., which can include, for example, screws or the like) can be used to retain the upper end of the plate 240 in position. In some embodiments (as shown in FIG. 5(B)), the same screws that are used to support the upper end of the plate 240 can also be used to mount the storage unit 210 upon the headliner of a vehicle (e.g., by attachment directly to the headliner).

In addition to the foregoing electronics components that can be supported on the electronics-components-support-plate 240, in various other embodiments a variety of other electronics components can be supported thereon based on circumstances.

6. Illustrative Vehicle Ceiling and/or Headliner Mounting Structures

Figure 7:
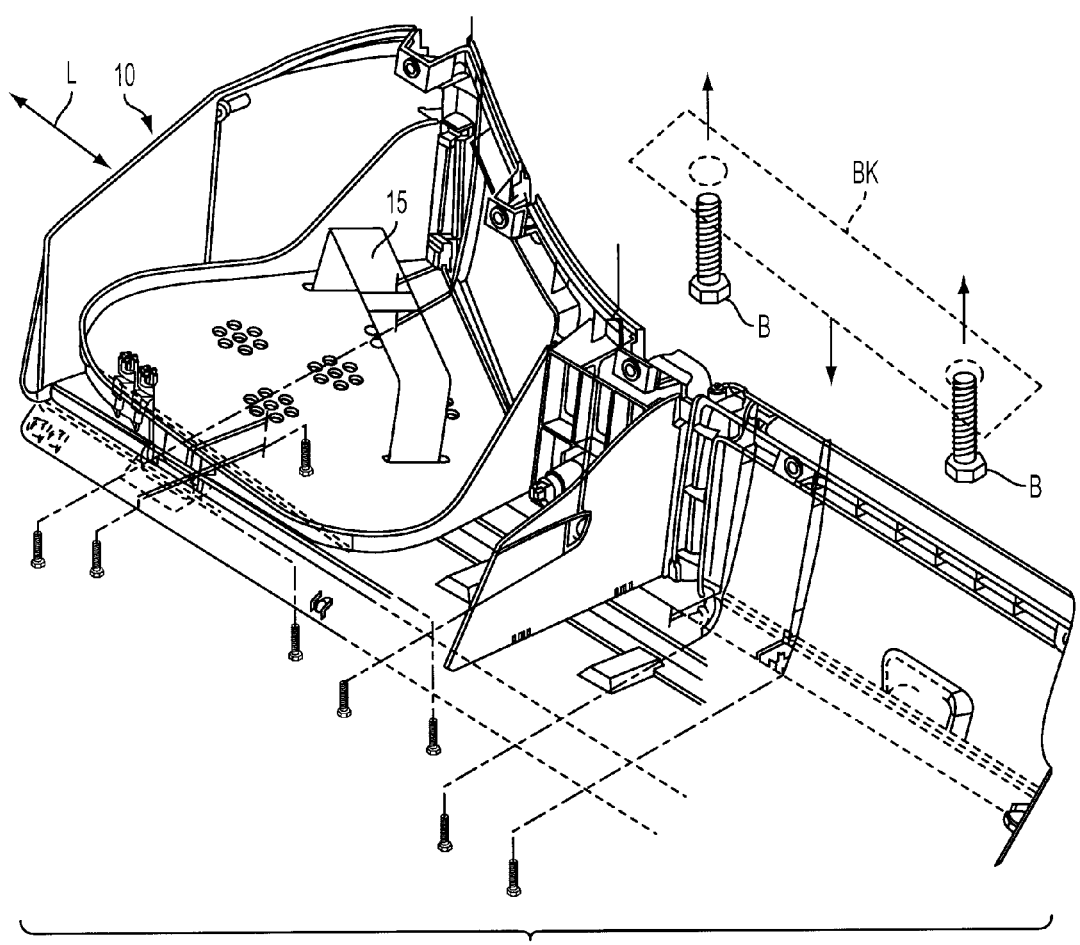
FIG. 7 is a top perspective view of another system of the present assignee over which the present invention improves upon.

As discussed above, in existing systems of the present assignee, as depicted in FIG. 7, an overhead storage unit 10 required the implementation of mounting brackets BK (shown in dashed lines) which were used to mount the storage unit to a headliner of the vehicle. As shown in FIG. 7, the bracket BK includes two illustrative bolts B that pass through mounting bracket BK so as to retain the bracket to the headliner. In turn, the mounting bracket, which is fixed to the storage unit, thus, supports the storage unit indirectly from the headliner.

On the other hand, according to some preferred embodiments of the invention, such additional mounting brackets are eliminated. Accordingly, the storage unit 210 according to these preferred embodiments can be directly mounted to the headliner. In this regard, as shown in FIG. 5(B), the upwardly projecting screws at the mounting member locations 211M can be directly screwed into the headliner.

In order to facilitate such direct attachment without the use of added bracket structures (i.e., since such bracket structures are typically made of metal and provide a higher strength and rigidity), the storage unit 210 is preferably modified to include strength enhanced edges, so as to facilitate such attachment. By way of example, as shown in FIG. 5(B), in some embodiments the upper end of the front wall 211 preferably includes a widened strengthening element 280 that is integrally and unitarily formed with the storage unit 210. By way of example, the strengthening element 280 can include, e.g., as shown, an overhanging wall having a plurality of reinforcing ribs 281 distributed there-over. In the preferred embodiments, the strengthening element 280 extends substantially along the length of the storage unit and extends between and connects the respective mounting member locations 211M as shown.

In addition, in some preferred embodiments as shown in FIG. 5(A), a plurality of caps or cover elements CP can be mounted (e.g., snap fit, or press fit) over the respective screw locations corresponding to mounting member locations 211M. Accordingly, in order to mount the storage unit within a vehicle, the caps CP can be removed, the unit can be screwed into place, and then the caps CP can be added. In this manner, the storage unit can be readily attached without costly, complex and bulky bracket members, and while the storage unit is, hence, itself screwed to the headliner in some preferred embodiments, the screws for such an attachment are kept from view and an increased level of aesthetic appeal and refinement can be achieved.

In order to maintain a high quality aesthetic appearance, it is helpful to avoid unnecessary exposure of screws, connectors or the like. In addition to the use of caps CP, which help to obscure unsightly screws, it is noteworthy that the screws 267 (shown in FIG. 4) which remain uncovered in some preferred embodiments (e.g., to facilitate easy opening and closing of the moving mechanism 264 via the use of, e.g., an ordinary screw-driver by the owner or user) are, while uncovered, effectively obscured from view. First, the screw located in the array of holes 212HH, is located within a similarly shaped hole 212H in such a manner as to camouflage the screws presence. Second, the other of the two screws is located underneath the visor 212V, such that, for the most part, the second screw is similarly obstructed from view.

In prior overhead storage systems, there have typically been additional complexities and costs that arise due to the implementation of such overhead storage systems in a plurality of vehicle models, having a plurality of internal structures, and, including a variety of headliner structures. Previously, different parts were required to be used for different vehicles and different headliner structures. This previously lead to increased complexities and increased costs. Accordingly, in some of the preferred embodiments herein, the mounting structure is specifically designed so as to accommodate a variety of vehicles, such as, e.g., by accommodating a variety of headliner structures.

Figure 6:
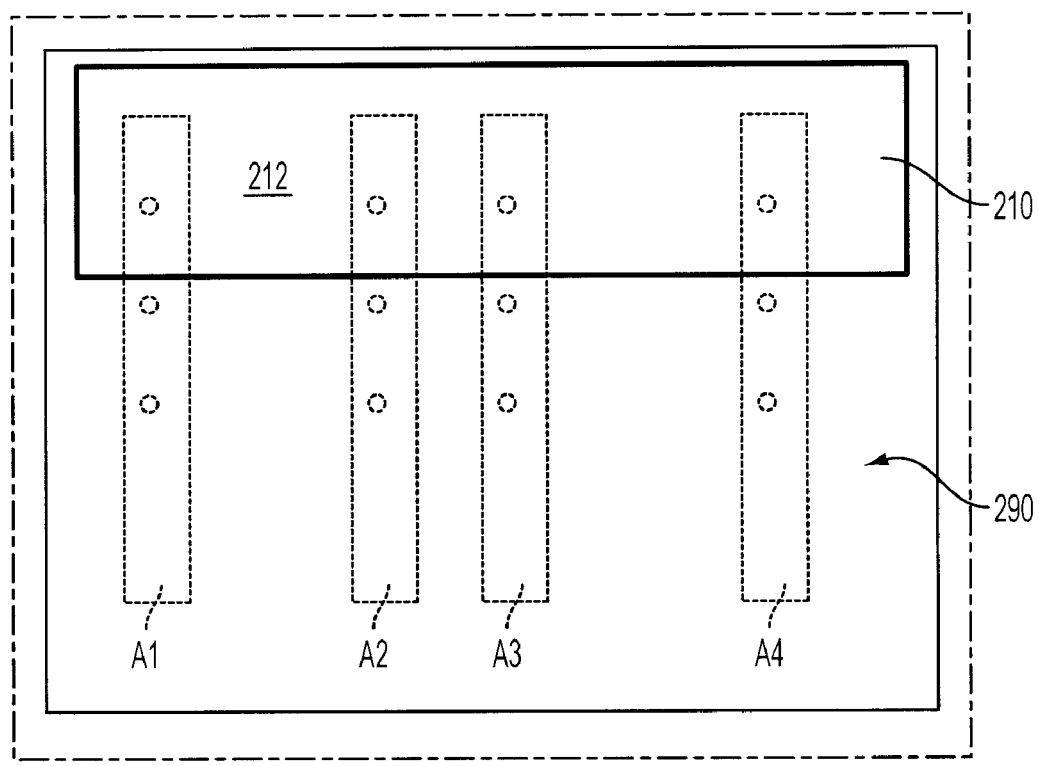
FIG. 6 is a diagram schematically depicting a bottom view of a storage unit 210 mounted upon a headliner or ceiling within a vehicle.

By way of example, in some illustrative embodiments, with reference to FIGS. 5(A) and 5(B), the multiple mounting member locations 211M are preferably selected upon initial design and manufacture to correspond to the headliner structure of a plurality of vehicles (such as, e.g., a whole line of vehicles, which can include, e.g., two, five, ten or more vehicles). By way of example, in mounting the storage unit 210 into certain vehicles one or more of the mounting members 211M may be extraneous and, hence, not utilized depending on the headliner structure of that vehicle. For example, FIG. 6 is a schematic diagram depicting an upward view of the bottom of a storage unit 210 as mounted upon the headliner 290. By way of example, consider that one vehicle may have mounting locations corresponding to positions A1, A2 and A4, while another vehicle may have mounting locations corresponding to positions A1, A3 and A4. Accordingly, in the preferred embodiments, the storage unit 210 is modified so as to include appropriate mounting locations for a plurality of vehicles. In this manner, a substantial reduction in parts and cost savings can be realized. Moreover, in some embodiments, the mounting members 211M can include through-holes for receiving screws that are screwed into the headliner. In some cases, to provide increased versatility in the applicability of the storage unit 210 to different vehicles, at least some of the through-holes can be elongated in the lateral direction L an amount to accommodate variations between at least some of the vehicle mounting requirements (i.e., such that the screw attachment position can vary laterally to some extent within such through-holes).

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. By way of example, while the detailed description and drawings depict an illustrative overhead storage unit, various aspects of the invention (such as, e.g., the improved electronic device mounting methods) can be employed within a wide variety of environments. In this regard, various features could, e.g., be implemented within dash boards of vehicles, consoles and/or at any other appropriate location as would be appreciated based on this disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. An ancillary electronic device storage assembly for a vehicle, comprising:
    a storage unit including at least one compartment configured to receive an electronic device, the compartment including through-holes and a bottom wall;
    an electronic device support that is a separate component from said storage unit and removably inserted into said at least one compartment and supported on the bottom wall;
    a substantially rigid retaining member configured to span over at least a portion of said electronic device support;
    said retaining member and said electronic device support cooperating to define an electronic device receiving space located between the retaining member and the electronic device support;
    said retaining member including a first position whereat said electronic device receiving space is provided with a first dimension extending between the retaining member and the electronic device support;
    said retaining member including a second position whereat said electronic device receiving space is provided with a second dimension extending between the retaining member and the electronic device support;
    said first dimension being greater than said second dimension; and
    a moving mechanism configured to move said retaining member from the first position to the second position, said moving mechanism including a manually driven element that is accessed from an exterior of said storage unit while said electronic device support is inserted into the at least one compartment via the through-holes.

2. The storage assembly for a vehicle of claim 1, wherein said moving mechanism holds the retaining member in a selected one of said first position and said second position.

3. The storage assembly for a vehicle of claim 1, wherein said manually driven element is accessed from below a lower surface of said storage unit.

4. The storage assembly for a vehicle of claim 1, further comprising an electronic device that is located in the electronic device receiving space, wherein:
    at least a portion of said retaining member is spaced from the electronic device when in said first position, said retaining member moving toward and against said electronic device as it transitions from the first position to the second position, whereat the retaining member secures the electronic device to the electronic device support.

5. The storage assembly for a vehicle of claim 1, wherein said moving mechanism is a screw drive mechanism.

6. The storage assembly for a vehicle of claim 1, wherein the moving mechanism includes at least one spring that biases the retaining member towards the first position.

7. The storage assembly for a vehicle of claim 1, further including:
- a channel formed along an upper surface of said electronic device support extending from a rear side toward a front side configured to receive wiring of the electronic device;
- a well proximate the front side of said electronic device support and accessible from a front lower side of the base into which said channel extends; and
- at least one electrical connector within said well for electrically connecting the wiring of the electronic device.

8. An ancillary electronic device storage assembly for a vehicle, comprising:
- a storage unit including through-holes and at least one compartment configured to receive an electronic device;
- an electronic device support that is a separate component from said storage unit and removably inserted into said at least one compartment;
- a substantially rigid retaining member configured to span over at least a portion of said electronic device support;
- said retaining member and said electronic device support cooperating to define an electronic device receiving space located between the retaining member and the electronic device support;
- said retaining member including a first position whereat said electronic device receiving space is provided with a first dimension extending between the retaining member and the electronic device support;
- said retaining member including a second position whereat said electronic device receiving space is provided with a second dimension extending between the retaining member and the electronic device support;
- said first dimension being greater than said second dimension; and a moving mechanism configured to move said retaining member from the first position to the second position, said moving mechanism including manually driven elements that are accessed from an exterior of said storage unit via the through-holes.

9. The storage assembly for a vehicle of claim 8, wherein said moving mechanism holds the retaining member in a selected one of said first position and said second position.

10. The storage assembly for a vehicle of claim 8, wherein said manually driven element is accessed from below a lower surface of said storage unit.

11. The storage assembly for a vehicle of claim 8, further comprising an electronic device that is located in the electronic device receiving space, wherein:
- at least a portion of said retaining member is spaced from the electronic device when in said first position, said retaining member moving toward and against said electronic device as it transitions from the first position to the second position, whereat the retaining member secures the electronic device to the electronic device support.

12. The storage assembly for a vehicle of claim 8, wherein said moving mechanism is a screw drive mechanism.

13. The storage assembly for a vehicle of claim 8, wherein the moving mechanism includes at least one spring that biases the retaining member towards the first position.

14. The storage assembly for a vehicle of claim 8, further including:
- a channel formed along an upper surface of said electronic device support extending from a rear side toward a front side configured to receive wiring of the electronic device;
- a well proximate the front side of said electronic device support and accessible from a front lower side of the base into which said channel extends; and
- at least one electrical connector within said well for electrically connecting the wiring of the electronic device.

15. The storage assembly for a vehicle of claim 8, wherein the compartment includes a bottom wall provided with the through-holes and the electronic device support is supported on the bottom wall.

* * * * *